Patented Jan. 29, 1929.

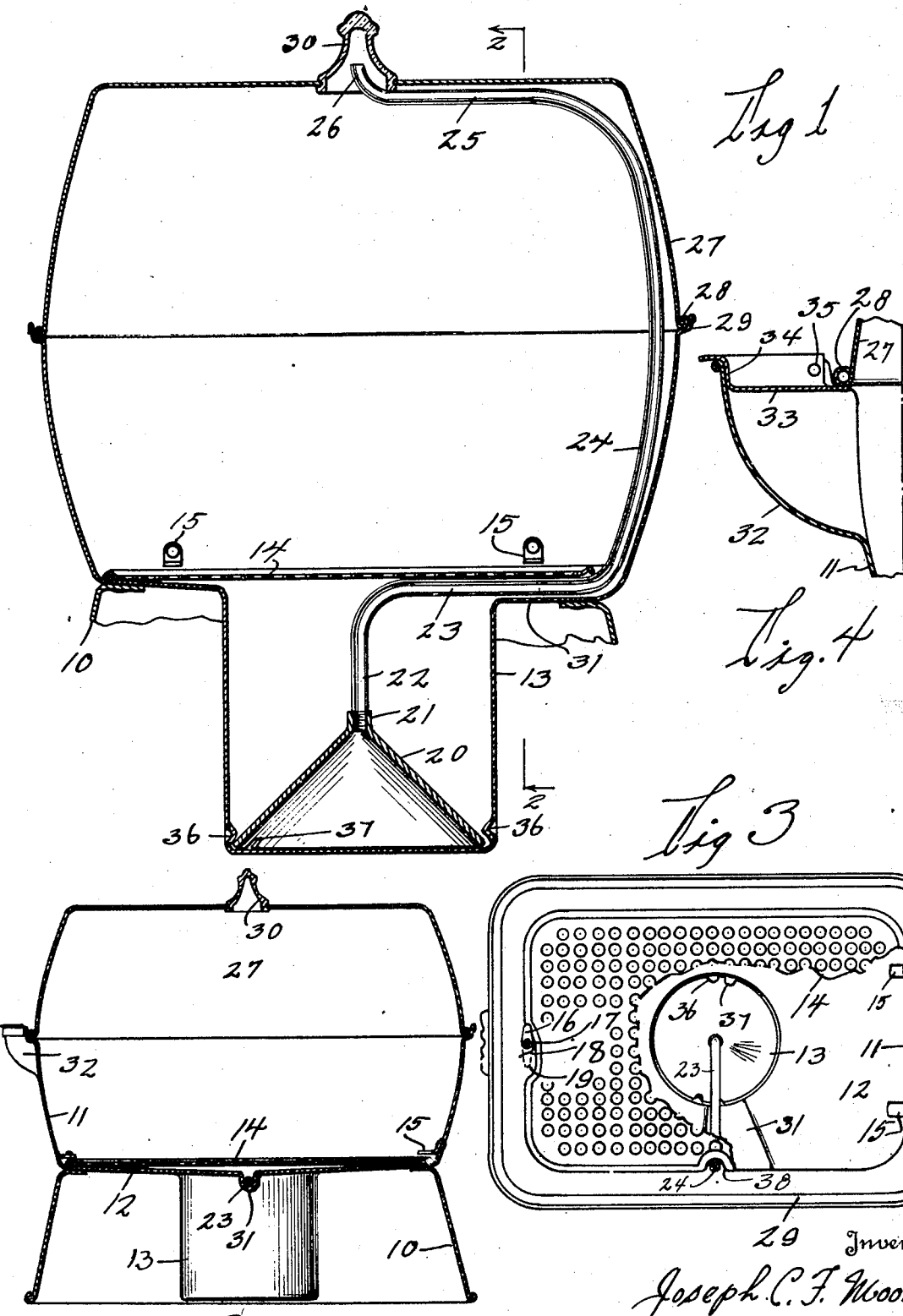

1,700,614

UNITED STATES PATENT OFFICE.

JOSEPH C. F. MOORE, OF SIOUX CITY, IOWA.

ROASTER.

Application filed January 23, 1928. Serial No. 248,720.

My invention relates to roasters of the self-basting type and has for its object generally to improve the construction of self-basting roasters.

More specifically it is my object to provide a roaster in which the percolating element is disposed so that a large portion of its length will, at all times, be filled with liquid in order that more steady percolation may be assured.

Another object is to provide means for retaining the percolating element in its proper position.

Another object is to provide a roaster in which the false bottom may be allowed to rest directly against the bottom of the roaster.

A further object is to provide means for retaining the false bottom in place and yet to allow its removal.

Another object is to provide a liquid entrance having a novel closure device, adapted to seal against the escape of steam from the roaster.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a central, transverse, sectional view through a roaster embodying my invention.

Fig. 2 is a sectional view taken on the line 2—2 of Fig. 1.

Fig. 3 is a plan view of the pan portion of the roaster, and

Fig. 4 is a detail, sectional view of the liquid receiving cup.

I am aware that roasters of the self-basting type, including the percolating element, are not new and it is not my intention to claim broadly such an arrangement. I have discovered, however, that an objection to such roasters has been that the height of the liquid in the baster could not be brought up sufficiently to insure a steady percolation. That is, with a short column of liquid in the steam of the percolating element, the steam formed in the bell, thereof, will force its way through the column of liquid before raising the column of liquid to the discharge mouth of the percolating steam. I have overcome this objection by positioning the percolating bell in a sump at the center of the rotating pan and extending a considerable portion of the percolating stem in a horizontal direction within the sump, the horizontal portion thereby being continuously under the liquid lever.

An embodiment of my invention in the accompanying drawings includes an apron base 10, upon which is supported the pan having the sides 11, the bottom 12 and the central sump 13 depending from the bottom. A perforated false bottom 14 rests upon the bottom 12, the latter being somewhat dished toward the center so as to space the false bottom a slight distance above the bottom and to allow drainage from all points of the false bottom to the sump.

The false bottom is held at one end by a pair of fingers 15, secured to one end wall of the pan and at its other end by a button 16, which is pivoted at 17 to a rest portion 18 of the bottom. The false bottom 14 is provided with an elongated indentation 19, which is offset from the center of the bottom in a lateral direction so that the button 16, when turned to the position shown in dotted lines in Fig. 3, may pass through the indentation while, when turned in the opposite direction, it will engage the rim of the false bottom to hold it securely in place.

The percolating element comprises a bell 20 fitting loosely within the sump 13 and a stem which is threaded at 21 into the valve and comprises a vertical portion 22, extending upwardly from the bell, a horizontal portion 23, extending laterally a distance sufficient to bring it approximately to one side of the pan, an upwardly curved portion 24, substantially following the contour of the sides of the pan and the top, an upper, horizontal portion 25, extending back to a point just above the center of the sump and an upwardly directed nozzle 26.

The cover of the roaster is shown at 27 and may be of conventional form, including a marginal bead 28, adapted to snugly rest within the shouldered periphery 29 of the pan. A glass dome 30 is inserted in the center of the upper wall of the cover 27 and the nozzle 26 extends within the dome as illustrated.

The bottom 12 of the pan is provided with a channelled trough 31, leading from the sump 13 to the side of the pan and deep enough to completely receive the horizontal portion 23 of the percolating stem.

It may now be noted that the horizontal portion 23 of the stem is received beneath the false bottom 14 and substantially below the upper lever of the sump so that, providing the sump is kept filled to the level of the false bottom, the horizontal portion 23 will be completely filled at all times with liquid. Thus greater than one third of the length of the stem is at all times filled with liquid. I have found that when the horizontal portion 23 of the stem is kept filled that percolation will take place in a very steady manner, whereas, when the liquid lever is allowed to fall below the horizontal portion corresponding to the condition existing in the ordinary type of self-baster, free steam will be allowed to escape through the column of liquid quite regularly, and a very small quantity of liquid will actually be carried to the nozzle at the end of the stem.

The glass dome 30 acts in the same capacity as in the ordinary percolating coffee pot, distributing the liquid in a spray over the contents of the roaster.

It may be noted that a further advantage of the horizontal portion 23 lies in the fact that the percolating stem may thus be positioned below the false bottom and yet the false bottom still allowed to rest upon the bottom 12 of the pan. Thus the false bottom may be removed and replaced without interference by the percolating element and the meat need not rest against the percolating element at any place.

At one end of the pan, I provide a liquid receiving cup 32, which is formed integrally with one end wall of the pan, at the upper edge thereof. The cup thus forms an entrance for adding water to the roaster when needed without removal of the cup. In order to prevent the escape of steam from the cup 32, I provide a lid 33, which is intended to form a flange 34, fitting within the outline of the cup and pivoted at 35 to the side walls of the cup. The lid 33 is depressed sufficiently to bring it just below the level of the bead 28 of the cover and is extended inwardly so as to snugly rest below and in contact with the bead when the lid is closed. It will be noted that upon raising the main portion of the lid, this extended portion will swing downwardly away from the bead 28. Thus the opening of the lid does not interfere with the cover in any manner and yet the cup is snugly closed at all times when the lid is down.

The purpose of locking the false bottom in place is to hold the percolating bell 20 securely against the raising action of the steam. This is accomplished in another manner by providing lugs 36, formed in the side walls of the cup 13, and adapted to engage the bell 20 as shown. The bell is provided with notches 37 to receive the lugs 36, and in inserting the bell, the notches are aligned with the lugs and the latter allowed to pass through them. The bell is then rotated to a position to move the notches away from the lugs. The bell is held against rotation by a notch 38 in the false bottom 14.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A self-basting roaster including a pan having a central sump depending from its bottom, a depressed trough formed in the bottom and extending from the sump to a side wall of the pan, a false bottom supported above the sump, a cover for the pan and a percolating element including a bell received within the sump and a stem extending upwardly from the bell, said stem including a horizontal portion received in the trough below the false bottom, the stem thence extending upwardly adjacent the side of the pan and back to a point positioned substantially over the center of the pan.

2. A self-basting roaster including a pan having a central sump depending from its bottom, a depressed trough formed in the bottom and extending from the sump to a side wall of the pan, a false bottom supported above the sump, and resting upon the bottom of the pan, a cover for the pan and a percolating element including a bell received within the sump and a stem extending upwardly from the bell, said stem including a horizontal portion received in the trough below the false bottom, the stem thence extending upwardly adjacent the side of the pan and back to a point positioned substantially over the center of the pan.

3. A self-basting roaster including a pan having a central sump depending from its bottom, a depressed trough formed in the bottom and extending from the sump to a side wall of the pan, a false bottom supported above the sump, a cover for the pan and a percolating element including a bell received within the sump and a stem extending upwardly from the bell, said stem including a horizontal portion received in the trough below the false bottom.

4. A self-basting roster including a pan having a central sump depending from the bottom thereof, a depressed trough formed in the bottom and extending from the sump to one side of the pan, a cover for the pan, a percolating element including a bell received within the sump and a horizontal stem portion received in said trough and means for supporting a piece of food above said horizontal portion.

5. In a roaster, a pan provided with an outwardly shouldered periphery, a cover having a peripheral bead snugly rested within said shouldered periphery, a liquid receiving cup formed at one wall of the pan, at the upper edge thereof, and a lid for said cup, said lid having a central depressed portion forming a peripheral flange snugly fitting within the cup, said flange being pivoted to the side walls of the cup and a central depressed portion of the lid extending beneath and substantially engaging the bead of the covering.

Signed this 14th day of January, 1928, in the county of Woodbury and State of Iowa.

JOSEPH C. F. MOORE.